US005640681A

United States Patent [19]

Barrett, Jr. et al.

[11] Patent Number: 5,640,681

[45] Date of Patent: Jun. 17, 1997

[54] BOOT-STRAPPED CASCODE CURRENT MIRROR

[75] Inventors: Raymond Louis Barrett, Jr., Ft. Lauderdale; Barry Wayne Herold, Boca Raton; Grazyna A. Pajunen, Delray Beach, all of Fla.

[73] Assignee: Motorola, Inc., Schaumburg, Ill.

[21] Appl. No.: 149,886

[22] Filed: Nov. 10, 1993

[51] Int. Cl.[6] .............. H04B 7/00; G05F 3/16

[52] U.S. Cl. .............. 455/38.1; 323/315; 327/541

[58] Field of Search .............. 330/288; 333/315, 333/316; 323/315; 455/38.3, 54.1

[56] References Cited

U.S. PATENT DOCUMENTS

| | | | |
|---|---|---|---|
| 5,142,696 | 8/1992 | Kosiec et al. | 455/260 |
| 5,311,115 | 5/1994 | Archer | 323/315 |
| 5,311,146 | 5/1994 | Brannon et al. | 330/288 |
| 5,359,296 | 10/1994 | Brooks et al. | 330/288 |
| 5,373,228 | 12/1994 | Holle | 323/315 |
| 5,373,249 | 12/1994 | Barrett, Jr. et al. | 330/264 |

*Primary Examiner*—Edward F. Urban

*Attorney, Agent, or Firm*—Gregg Rasor

[57] ABSTRACT

A cascode current mirror circuit includes a cascode connected input stage (401) that operates to conduct an input current (400) in response to an input voltage of an input signal coupled to an effective transconductance of the cascode connected input stage (401). An input mirroring transistor (404) operates to control a mirror reference current (406) in response to the input voltage of the input signal. A diode connected transistor (409) coupled to a second control node of the cascode connected input stage (410) generates a control bias proportional to the mirror reference current (406) and to the input signal. A cascode connected output stage (411) has a first control node (413) coupled to the input signal and a second control node (414) coupled to the diode connected transistor (409) and the second control node (410) of the cascode connected input stage (401) for establishing an output current (415) that is substantially equivalent to the input current (400).

16 Claims, 4 Drawing Sheets

BOOT-STRAPPED CASCODE CURRENT MIRROR

FIELD OF THE INVENTION

This invention relates in general to a transistorized electronic current mirror and more particularly to a self-biasing boot-strapped cascode current mirror for use in a radio frequency communication device.

BACKGROUND OF THE INVENTION

In portable battery operated products such as a radio frequency communication device, it is desirable to have the lowest possible overall current drain in order to maximize battery life. Moreover, it is desirable to operate such products at the lowest possible voltage so as to minimize their total power consumption.

Conventional radio frequency communication devices may use one or more application specific integrated circuits to implement functions such as phase lock loops to synthesize frequencies needed for digital logic or radio frequency circuits. To conserve power, a synthesizer or other circuitry implemented in an application specific integrated circuit should be operated using as low a voltage as possible. Moreover, to conserve even more power, these circuits may be operated in a power saving mode where one or more of the circuits are switched on during active processing periods (e.g., signal transmission or reception, data storage, retrieval, or presentation) and off during "sleep" or "rest" periods. Operating in this fashion, a portable battery operated product can substantially increase available battery life, thus resulting in more usable "talk time" in a radio frequency communication device such as a cellular telephone or the like.

In the past, low voltage circuitry implemented in application specific integrated circuits typically consisted of bipolar analog or $I^2L$ (integrated injection logic) logic circuits. These bipolar circuits experienced problems such as poor high speed operation ($I^2L$ operating at 0.25 μA per gate is typically operational to only around 50 KHz), a lack of dynamic range (conventional low bipolar analog circuits have a saturation point of typically 200 mV, yielding a range of less than 600 mV from a one volt supply), and extreme variation of their intrinsic operating characteristics over temperature.

Thus, what is needed is low voltage CMOS (complimentary metal oxide semiconductor) process and appropriate circuit topologies that allow a designer to achieve both analog and digital functions using an application specific integrated circuit in a radio frequency communication device. As such, the low voltage CMOS designs would operate at significantly lower power levels than comparable bipolar designs. Moreover, when operated in a power saving mode, the CMOS designs can more effectively conserve power while offering improved circuit performance characteristics.

SUMMARY OF THE INVENTION

Briefly, according to the invention, there is provided a cascode current mirror circuit comprising: a cascode connected input stage having an effective transconductance, the cascode connected input stage operating to conduct an input current in response to an input voltage of an input signal coupled to the effective transconductance by an input conduction terminal and a first control node; an input mirroring transistor having a control node coupled to the input signal, the input mirroring transistor operating to control a mirror reference current in response to the input voltage of the input signal; a diode connected transistor coupled to a second control node of the cascode connected input stage for generating a control bias proportional to the mirror reference current and to the input signal; and a cascode connected output stage having an output conduction terminal, a first control node, and a second control node, the first control node being coupled to the input signal, the second control node being coupled to the diode connected transistor and the second control node of the cascode connected input stage for establishing an output current that is substantially equivalent to the input current.

DESCRIPTION OF A PREFERRED EMBODIMENT

Figure 1:
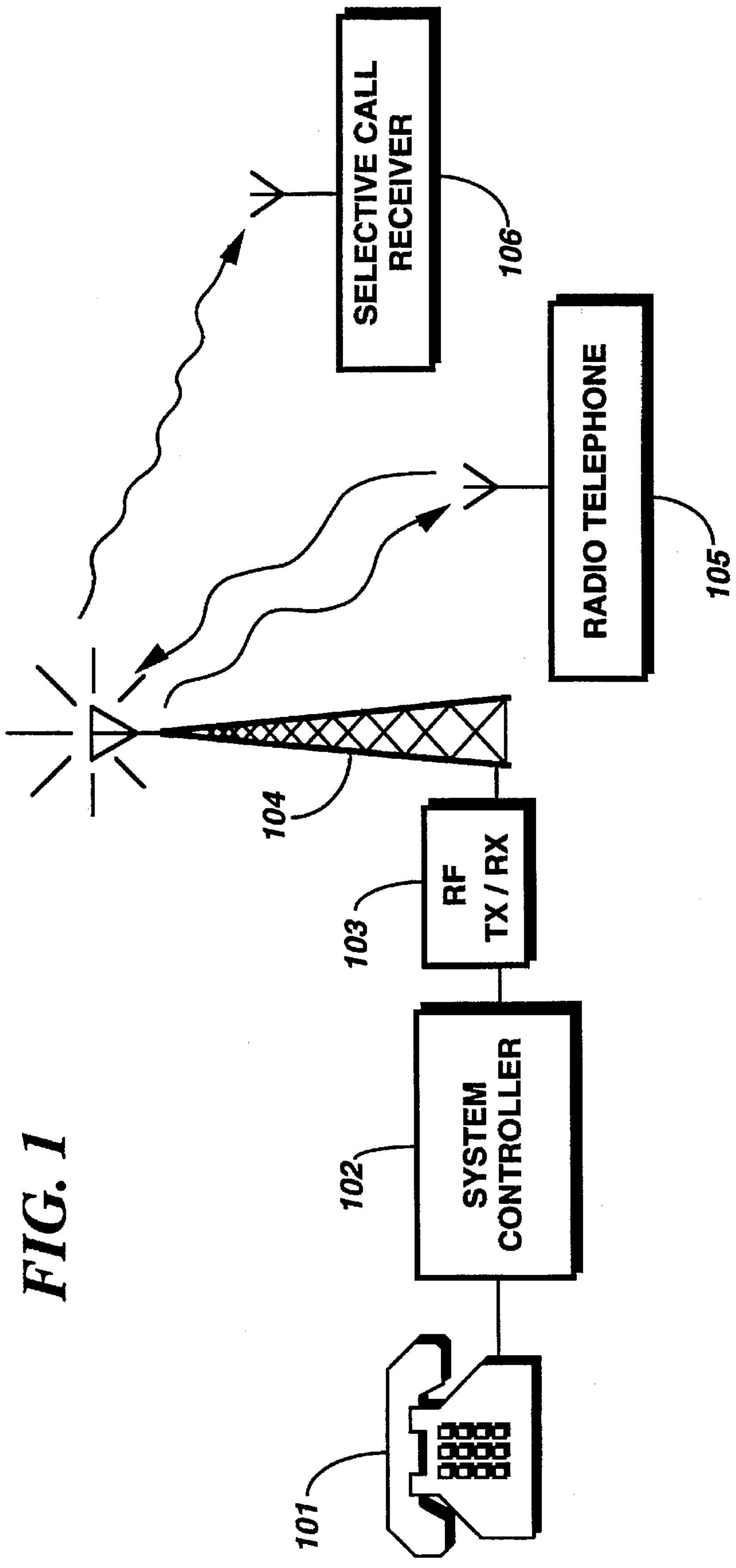
FIG. 1 is a block diagram of a radio frequency communication system suitable for use with the present invention.

Referring to FIG. 1, the preferred embodiment of a radio communication system comprises a telephone 101 connected by a conventional public switched telephone network (PSTN) to a system controller 102 which may oversee operation of the radio frequency transmitter/receiver 103 and encodes and decodes the inbound and outbound addresses into formats that are compatible the respective land line and cellular radio telephone addressing requirements. The system controller 102 can also function to encode paging messages for transmission by the radio frequency transmitter/receiver 103. Telephony signals are transmitted to and received from a radio telephone 105 by at least one antenna 104 coupled to the radio frequency transmitter/receiver 103. The radio frequency transmitter/receiver 103 may also be used to transmit paging messages to an optional selective call receiver 106.

It should be noted that the system controller 102 is capable of operating in a distributed transmission control environment that allows mixing cellular, simulcast, master/slave, or any conventional wide and local area coverage scheme. Moreover, as one of ordinary skill in the art would recognize, the telephonic and paging functions may reside in separate system controllers that may operate either independently or in a networked fashion.

Figure 2:
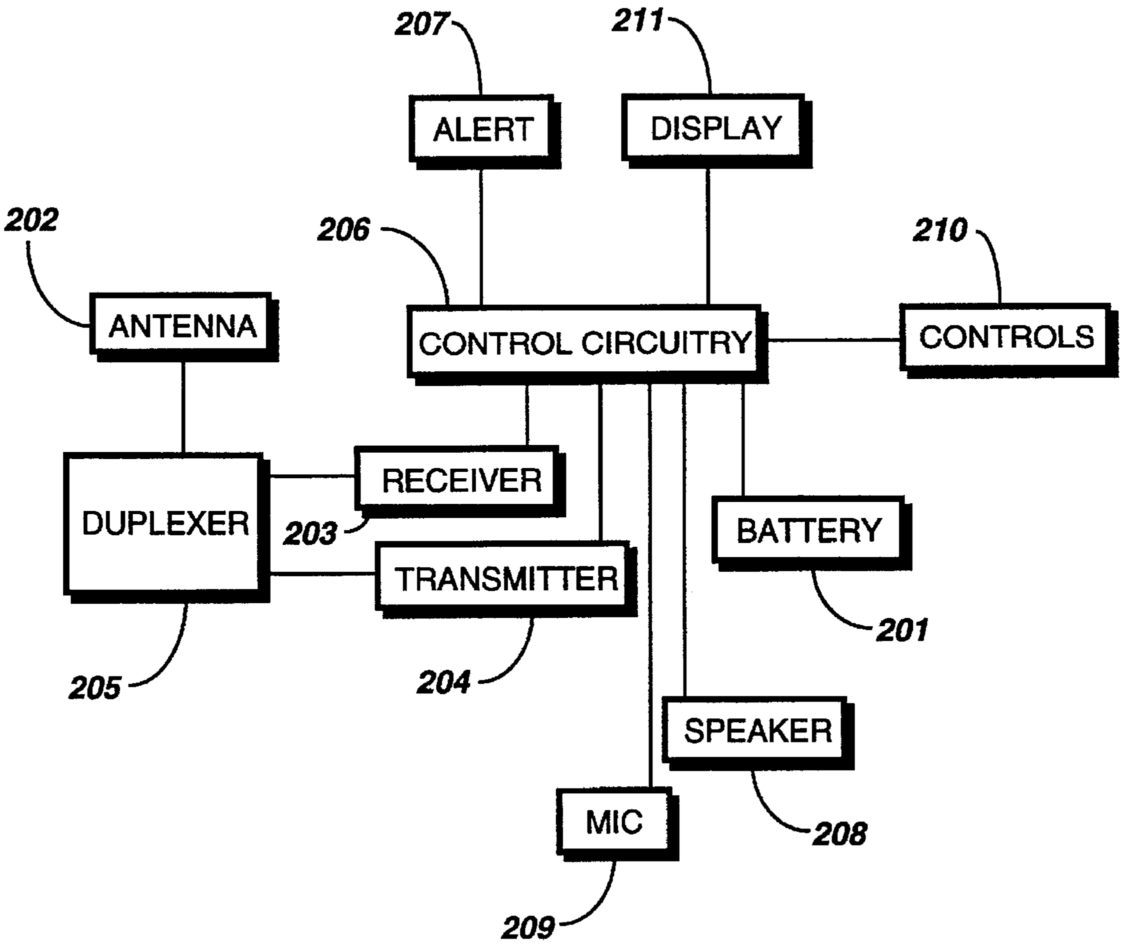
FIG. 2 is a block diagram of a radio telephone depicted in FIG. 1 system suitable for use with the present invention.

Referring to FIG. 2, a block diagram is shown of a battery 201 powered radio telephone. A radio frequency signal is received and/or transmitted by an antenna 202. The antenna is coupled to a receiver 203 and a transmitter 204 by a duplexer 205. The received signal is coupled from the receiver 203 to the control circuitry 206 for recovering any information contained within the received signal. This recovered information is then used to activate an alert 207 (a ringer in the case of a cellular radio telephone), and after answering the call, to sustain a telephone connection. When the telephone connection is completed, the user may audibly communicate with another party via a speaker 208 and a microphone 209. The control circuitry 206 routes recovered audio to the speaker 208 which converts electrical energy into acoustical energy thus enabling the user to hear any communications. The microphone 209 is used to convert acoustic energy into electrical energy for use by the control circuitry 206 in modulating the radio frequency carrier produced by the transmitter 204.

The user may initiate a call by selecting the proper control 210 and entering a number of a party to be contacted. When entering and sending, the number may be presented on a display 211 to provide the user with visual feedback confirming the number entered and subsequently sent.

Figure 3:
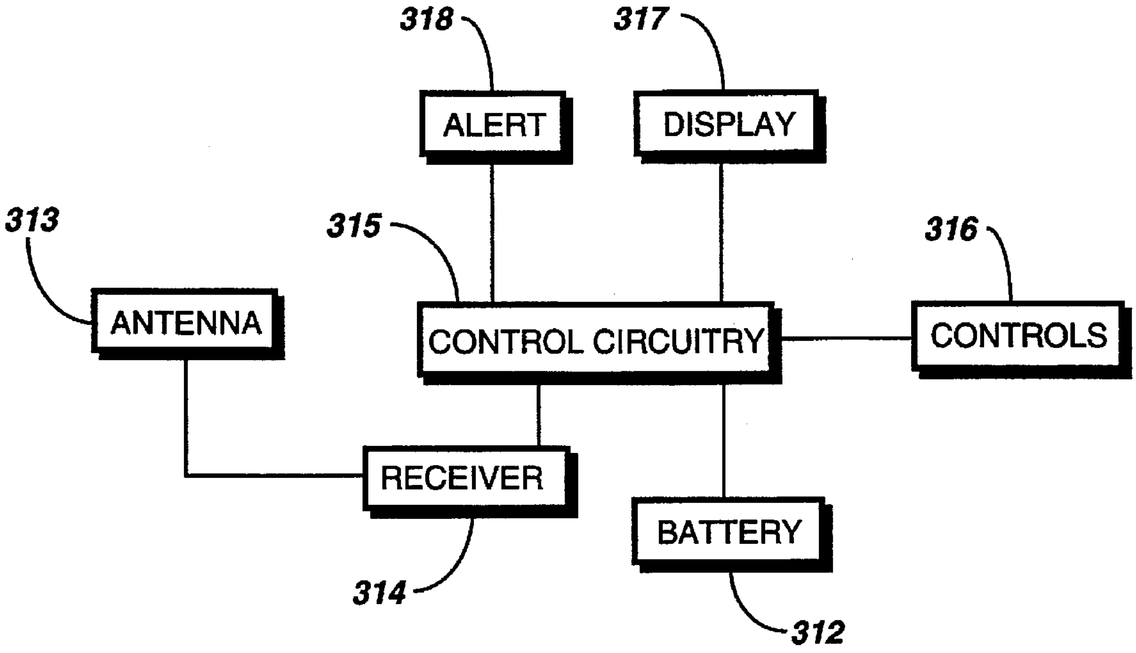
FIG. 3 is a block diagram of a selective call receiver depicted in FIG. 1 system suitable for use with the present invention.

Referring to FIG. 3, a block diagram is shown of a battery 312 powered selective call receiver. The selective call receiver operates to receive a signal via an antenna 313. The received signal is routed from the antenna 313 to the receiver 314. The receiver 314 operates to demodulate the received signal using conventional techniques and forwards a demodulated signal to the control circuitry 315, which decodes and recovers information contained within the received signal. In accordance with the recovered information and user controls 316, the selective call receiver may present at least a portion of the information, such as by a display 317, and may signal the user via a sensible alert 318 that a message has been received.

In the preferred embodiments of both the radio telephone and the selective call receiver, the associated control circuitry 206, 315 may comprise a number of active function circuits that use cascode current mirror circuits to implement command and control functions associated with the radio frequency communication device. By example, the active function circuits may be included in large scale devices such as a microprocessor or application specific integrated circuit for enabling functions such as a signal processor (e.g., a decoder), a conventional signal multiplexer, a voltage regulator that may supply a regulated voltage to other portions of the radio. Alternatively, the associated control circuitry 206, 315 may include active function circuits such as A/D and D/A converters, programmable I/O ports, a control buss, environmental sensing circuitry such as for light or temperature conditions, audio power amplifier circuitry, control interface circuitry, a clock or local oscillator frequency synthesizer, and display illumination circuitry. These elements are typically conventionally assembled to provide the marketable features comprising the radio telephone or selective call receiver requested by a customer.

Figure 4:
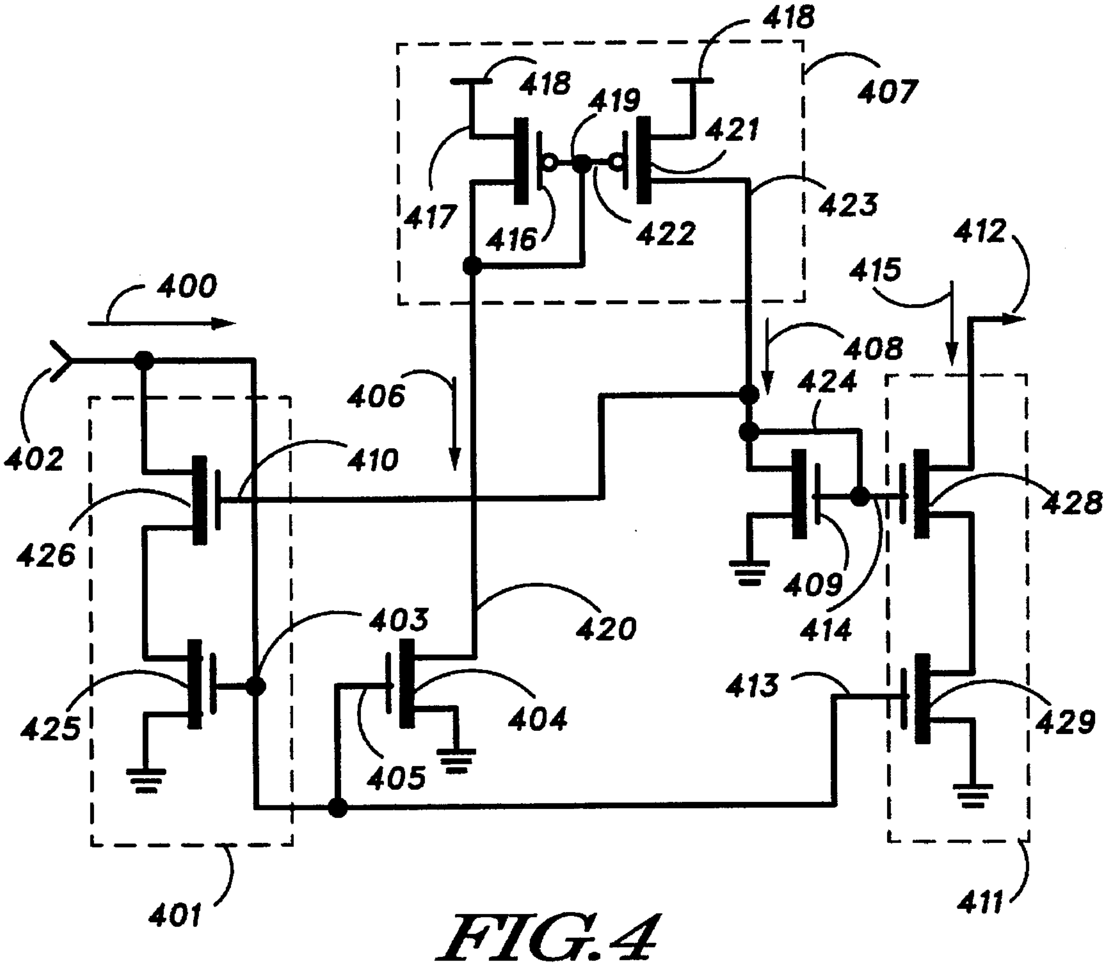
FIG. 4 is a schematic diagram of a cascode current mirror circuit in accordance with the preferred embodiment of the present invention.

Referring to FIG. 4, a schematic diagram illustrates a cascode current mirror circuit in accordance with the preferred embodiment of the present invention.

The cascode current mirror circuit comprises a cascode connected input stage 401 having an effective transconductance, the cascode connected input stage operating to conduct an input current 400 in response to an input voltage of an input signal coupled to the effective transconductance by an input conduction terminal 402 and a first control node 403; an input mirroring transistor 404 having a control node 405 coupled to the input signal, the input mirroring transistor operating to control a mirror reference current 406 in response to the input voltage of the input signal; a current mirror 407 coupled to the input mirroring transistor 404, the current mirror 407 operating to generate a mirror output current 408 that is proportional to the mirror reference current 406; a diode connected transistor 409 coupled to the current mirror 407 and the second control node 410 of the cascode connected input stage 401 for generating a control bias in response to the mirror output current 408, the control bias being proportional to the input signal; and a cascode connected output stage 411 having an output conduction terminal 412, a first control node 413, and a second control node 414, the first control node 413 being coupled to the input signal, the second control node 414 being coupled to the diode connected transistor 409 and the second control node 410 of the cascode connected input stage 401 for establishing an output current 415 that is substantially equivalent to the input current 400.

The current mirror comprises a diode connected mirror transistor 416 having a bias node 417 coupled to a voltage bias 418 and a diode connected node 419 coupled to a conduction node 420 of the input mirroring transistor 404. The diode connected mirror transistor 416 operates at the mirror reference current 406. A current mirroring transistor 421 having a control node 422 coupled to the diode connected node 419 of the diode connected mirror transistor 416 and a conduction node 423 coupled to a diode connected node 424 of the diode connected transistor 409 operates to conduct the mirror output current 408 between the voltage bias 418 and the diode connected node 424 of the diode connected transistor 409 at a magnitude determined at least in part by a ratio of effective device geometries between the diode connected mirror transistor 416 and the current mirroring transistor 421.

The ratio of effective device geometries between the diode connected mirror transistor 416 and the current mirroring transistor 421 acts to control a current gain realized between the first mirror current 406 and the mirror output current 408.

More specifically, the cascode connected input stage 401 comprises a common source transistor 425 coupled to the input signal and the input mirroring transistor 404 for establishing the input current 400 in the cascode connected transistor input stage 401. A common gate transistor 426 is coupled to the diode connected transistor 409 and the common source transistor 425 for isolating the common source transistor 425 from any change in the input voltage present at the input conduction terminal 402 while operating to set the output current 415 conducted by the cascode connected output stage 411 in response to the control bias.

Similarly, the cascode connected output stage 411 comprises a common source transistor 427 coupled to the input signal and the input mirroring transistor 404 for establishing an output current 415 in the cascode connected transistor output stage 411. A common gate transistor 428 is coupled to the diode connected transistor 409 and the common source transistor 427 for isolating the common source transistor 427 from any change in an output voltage present at the output conduction terminal 412 of the common gate transistor 428 while operating to control the output current 415 conducted by the common gate transistor 428 in response to the control bias.

In accordance with the preferred embodiment of the present invention, the cascode current mirror circuit discussed in reference to FIG. 4 is part of at least one active function circuit included in the control circuit for the radio frequency communication device. As can be appreciated by one of ordinary skill in the art, this invention can be realized in a number of embodiments of which the disclosed embodiment is only one of many equivalent alternatives. Low voltage CMOS (complimentary metal oxide semiconductor) designs operate at significantly lower power levels than conventional bipolar designs, and when operated in a power saving mode, the CMOS designs can more effectively conserve power while offering improved circuit performance characteristics.

What is claimed is:

1. A cascode current mirror circuit comprising:

a cascode connected input stage having an effective transconductance, the cascode connected input stage operating to conduct an input current in response to an input voltage of an input signal coupled to the effective transconductance by an input conduction terminal and a first control node of a common source transistor coupled to the input signal for establishing the input current in the cascode connected transistor input stage;

an input mirroring transistor having a control node coupled to the input signal, the input mirroring transistor operating to control a mirror reference current in response to the input voltage of the input signal;

a diode connected transistor coupled to a second control node of a common gate transistor and the common source transistor for isolating the common source transistor from any change in the input voltage present at the input conduction terminal while operating to set an output current conducted by a cascode connected output stage in response to a control bias proportional to the mirror reference current and to the input signal, the cascode connected output stage having an output conduction terminal, a first control node, and a second control node, the first control node being coupled to the input signal, the second control node being coupled to the diode connected transistor and the second control node of the cascode connected input stage for establishing the output current substantially equivalent to the input current.

2. The cascode current mirror circuit according to claim 1 further comprising:

a current mirror coupled to the input mirroring transistor, the current mirror operating to generate a mirror output current that is proportional to the mirror reference current, the mirror output current being coupled to the diode connected transistor for generating the control bias that establishes the output current in the cascode connected transistor output stage as being substantially equivalent to the input current in the cascode connected input stage.

3. The cascode current mirror circuit according to claim 2 wherein the current mirror comprises:

a diode connected mirror transistor having a bias node coupled to a voltage bias and a diode connected node coupled to a conduction node of the input mirroring transistor, the diode connected mirror transistor operating at the mirror reference current; and a current mirroring transistor having a control node coupled to the diode connected node of the diode connected mirror transistor and a conduction node coupled to a diode connected node of the diode connected transistor, the current mirroring transistor operating to conduct the mirror output current between the voltage bias and the diode connected node of the diode connected transistor at a magnitude determined at least in part by a ratio of effective device geometries between the diode connected mirror transistor and the current mirroring transistor.

4. The cascode current mirror circuit according to claim 3 wherein the ratio of effective device geometries between the diode connected mirror transistor and the current mirroring transistor controls a current gain realized between the mirror reference current and the mirror output current.

5. The cascode current mirror circuit according to claim 1 wherein the cascode connected output stage comprises:

a common source transistor coupled to the input signal and the input mirroring transistor for establishing the output current in the cascode connected transistor output stage; and a common gate transistor coupled to the diode connected transistor and the common source transistor for isolating the common source transistor from any change in an output voltage present at the output conduction terminal of the common gate transistor while operating to control the output current conducted by the common gate transistor in response to the control bias.

6. The cascode current mirror circuit according to claim 1 wherein the cascode current mirror circuit is part of an active function circuit included in a control circuit for a radio frequency communication device.

7. A cascode current mirror circuit comprising:

a cascode connected input stage having an effective transconductance, the cascode connected input stage operating to conduct an input current in response to an input voltage of an input signal coupled to the effective transconductance by an input conduction terminal and a first control node of a common source transistor coupled to the input signal for establishing the input current in the cascode connected transistor input stage;

an input mirroring transistor having a control node coupled to the input signal, the input mirroring transistor operating to control a mirror reference current in response to the input voltage of the input signal;

a current mirror coupled to the input mirroring transistor, the current mirror operating to generate a mirror output current that is proportional to the mirror reference current;

a diode connected transistor coupled to the current mirror and the second control node of a common gate transistor and the common source transistor for isolating the common source transistor from any change in the input voltage present at the input conduction terminal while operating to set an output operating current conducted by a cascode connected output stage in response to a control bias proportional to the mirror reference current and to the input signal, the cascode connected output stage having an output conduction terminal, a first control node, and a second control node, the first control node being coupled to the input signal, the second control node being coupled to the diode connected transistor and the second control node of the cascode connected input stage for establishing the output current substantially equivalent to the input current.

8. The cascode current mirror circuit according to claim 7 wherein the current mirror comprises:

a diode connected mirror transistor having a bias node coupled to a voltage bias and a diode connected node coupled to a conduction node of the input mirroring transistor, the diode connected mirror transistor operating at the mirror reference current; and a current mirroring transistor having a control node coupled to the diode connected node of the diode connected mirror transistor and a conduction node coupled to a diode connected node of the diode connected transistor, the current mirroring transistor operating to conduct the mirror output current between the voltage bias and the diode connected node of the diode connected transistor at a magnitude determined at least in part by a ratio of effective device geometries between the diode connected mirror transistor and the current mirroring transistor.

9. The cascode current mirror circuit according to claim 8 wherein the ratio of effective device geometries between the diode connected mirror transistor and the current mirroring transistor controls a current gain realized between the mirror reference current and the mirror output current.

10. The cascode current mirror circuit according to claim 7 wherein the cascode connected output stage comprises the common source transistor coupled to the input signal and the input mirroring transistor, the common source transistor operating to establish the output operating current in the cascode connected transistor output stage; and the common gate transistor coupled to the diode connected transistor and the common source transistor, the common gate transistor operating to isolate the common source transistor from any change in an output voltage present at the output conduction terminal of the common gate transistor while operating to control an output operating current conducted by the common gate transistor in response to the control bias.

11. The cascode current mirror circuit according to claim 7 wherein the cascode current mirror circuit is part of an active function circuit included in a control circuit for a radio frequency communication device.

12. A radio frequency communication device, comprising:

a control circuit for managing information communication by the radio frequency communication device, the control circuit comprising:

at least one active function circuit that implements command and control functions associated with the radio frequency communication device, the at least one active function circuit including at least one cascode current mirror circuit, comprising:

a cascode connected input stage having an effective transconductance, the cascode connected input stage operating to conduct an input current in response to an input voltage of an input signal coupled to the effective transconductance by an input conduction terminal and a first control node;

an input mirroring transistor having a control node coupled to the input signal, the input mirroring transistor operating to control a mirror reference current in response to the input voltage of the input signal;

a current mirror coupled to the input mirroring transistor, the current mirror operating to generate a mirror output current that is proportional to the mirror reference current;

a diode connected transistor coupled to the current mirror and the second control node of the cascode connected input stage for generating a control bias in response to the mirror output current, the control bias being proportional to the input signal; and a cascode connected output stage having an output conduction terminal, a first control node, and a second control node, the first control node being coupled to the input signal, the second control node being coupled to the diode connected transistor and the second control node of the cascode connected input stage for establishing an output current that is substantially equivalent to the input current.

13. The radio frequency communication device according to claim 12 wherein the current mirror comprises:

a diode connected mirror transistor having a bias node coupled to a voltage bias and a diode connected node coupled to a conduction node of the input mirroring transistor, the diode connected mirror transistor operating at the mirror reference current; and a current mirroring transistor having a control node coupled to the diode connected node of the diode connected mirror transistor and a conduction node coupled to a diode connected node of the diode connected transistor, the current mirroring transistor operating to conduct the mirror output current between the voltage bias and the diode connected node of the diode connected transistor at a magnitude determined at least in part by a ratio of effective device geometries between the diode connected mirror transistor and the current mirroring transistor.

14. The radio frequency communication device according to claim 13 wherein the ratio of effective device geometries between the diode connected mirror transistor and the current mirroring transistor controls a current gain realized between the mirror reference current and the mirror output current.

15. The radio frequency communication device according to claim 13 wherein the cascode connected input stage comprises:

a common source transistor coupled to the input signal and the input mirroring transistor for establishing the input current in the cascode connected transistor input stage; and a common gate transistor coupled to the diode connected transistor and the common source transistor for isolating the common source transistor from any change in the input voltage present at the input conduction terminal while operating to set the output current conducted by the cascode connected output stage in response to the control bias.

16. The radio frequency communication device according to claim 13 wherein the cascode connected output stage comprises:

a common source transistor coupled to the input signal and the input mirroring transistor for establishing the output current in the cascode connected transistor output stage; and a common gate transistor coupled to the diode connected transistor and the common source transistor for isolating the common source transistor from any change in an output voltage present at the output conduction terminal of the common gate transistor while operating to control the output current conducted by the common gate transistor in response to the control bias.

* * * * *